United States Patent [19]

Jeffreys

[11] Patent Number: 4,602,904

[45] Date of Patent: Jul. 29, 1986

[54] METHOD OF OBTAINING TEMPERATURE OF AN OBJECT BEING HEAT TREATED

[75] Inventor: Lyman W. Jeffreys, Barrington, Ill.

[73] Assignee: Amsted Industries Incorporated, Chicago, Ill.

[21] Appl. No.: 743,812

[22] Filed: Jun. 12, 1985

[51] Int. Cl.[4] ........................ F27D 3/00; F27D 21/00; G01K 1/08; F27B 9/16

[52] U.S. Cl. ........................................ 432/11; 165/86; 236/15 BC; 374/154; 432/32; 432/36; 432/138

[58] Field of Search ..................... 432/11, 32, 36, 138; 236/15 BC; 165/86; 374/153, 154

[56] References Cited

U.S. PATENT DOCUMENTS

| | | | |
|---|---|---|---|
| 1,452,856 | 4/1923 | Trinks | 432/32 |
| 1,808,507 | 6/1931 | Poole | 432/32 |
| 2,622,862 | 12/1952 | Talley | 432/138 |

*Primary Examiner*—John J. Camby

*Attorney, Agent, or Firm*—Edward J. Brosius; Charles E. Bouton

[57] ABSTRACT

The present invention provides a method and apparatus for determining the temperature of an object as it moves through a heat treating furnace. The furnace includes a hearth adapted to move through it thusly enabling a number of objects placed on the hearth to be heat treated as they move through the furnace. To obtain the temperature of an object being heat treated as it moves through the furnace, a hole is provided in the hearth. A thermocouple wire is inserted through the hole and into the furnace. An end of the wire is connected to an object being heat treated, and the object is placed in the furnace. The other end of the wire is connected to a temperature display device outside of the furnace which moves along with the hearth and the object as they move through the furnace.

11 Claims, 2 Drawing Figures

METHOD OF OBTAINING TEMPERATURE OF AN OBJECT BEING HEAT TREATED

BACKGROUND OF THE INVENTION

The present invention relates to a method of obtaining the temperature of an object being heat treated and, more particularly, to a method of determining the temperature of an object moving along with a hearth through a heat treating furnace.

Industrial heat treating furnaces capable of heat treating large cast metal objects such as railway wheels are themselves fairly large. A preferred design of such heat treating furnaces is of a circular configuration. Such a circular configuration permits the continuous movement within the furnace of a ring shaped insulated hearth. The furnace itself is comprised of a ring shaped insulated heated area having heating means such as gas burners located both on the inner side and outer side of the ring shaped insulated heated area. A charging door and a discharging door are usually located adjacent each other on an outer surface of the ring. The charging door is utilized to insert the objects such as railway wheels into the heating area of the furnace and onto a support on the movable hearth. Typically such furnaces can accommodate about ninety railway wheels, and the hearth rotates within the furnace at such a speed so as to expose each wheel to about a two-hour heat treating operation. Although it is a fairly straight forward matter to monitor the temperature of particular zones within the heat treating furnace insulated area, it has been a problem to provide a continuous temperature determination of each object being heat treated as it moves throughout the furnace. Depending on the desired properties to be obtained during the heat treating process, it is desirable to have such an accurate temperature determination available at all times during the objects travel through the heat treating furnace. A prior method was to attach a thermocouple wire to the object being heat treated and to allow the object to travel throughout the furnace feeding additional thermocouple wire through the charging door into the furnace as the hearth rotated. This method was undesirable due to the use of extremely long runs of costly thermocouple wire which had to run the entire circumference of the heat treating furnace. As a typical diameter for such furnaces is about 70 feet (21 meters), making a total circumference of about 220 feet (67 meters), the length of thermocouple wire is rather long. Such wire can be used only once and accordingly, presents a rather high expense. In addition, due to the long run of thermocouple wire through the furnace, there is a great possibility of errors in the temperature readings.

SUMMARY OF THE INVENTION

It is an object of the present invention to provide an improved method and apparatus for determining the temperature of an object as it passes through a heat treating furnace.

The hearth of the circular heat treating furnace is a flat, ring shaped surface of refractory material. The hearth is adapted to rotate in the heat treating furnace usually by use of a rail and roller support assembly on the lower surface of the hearth. The upper surface of the hearth is adapted to receive and support the objects to be heat treated. The present invention includes the provision of a small diameter hole through the hearth to enable the thermocouple wire to pass through the hole in the hearth and into the insulated portion of the furnace. The thermocouple is pulled through the charging door of the furnace and affixed to the object to be heat treated outside the furnace. The object is then placed into the furnace on the support on the upper surface of the hearth. The thermocouple wire is pulled outwardly from the hearth to insure that a minimum amount of thermocouple wire runs from the object being heat threated to the outer portion of the hearth. The other end of the thermocouple wire is then connected to a temperature display device such as a digital thermometer, recording chart, or tape storage device. This temperature display or recording device can be placed on the floor outside of the furnace and moved manually every so often as required to keep pace with the object and hearth moving through the heat treating furnace. More conveniently, the temperature display or recording device can be affixed to an edge of the hearth and, accordingly, move with the hearth and the object being heat treated along the heat treating furnace.

Accordingly, the present invention provides an accurate method and apparatus for determining the temperature of an object as it moves through a heat treating furnace while utilizing a minimum amount of thermocouple wire.

DESCRIPTION OF THE PREFERRED EMBODIMENT

Figure 1:
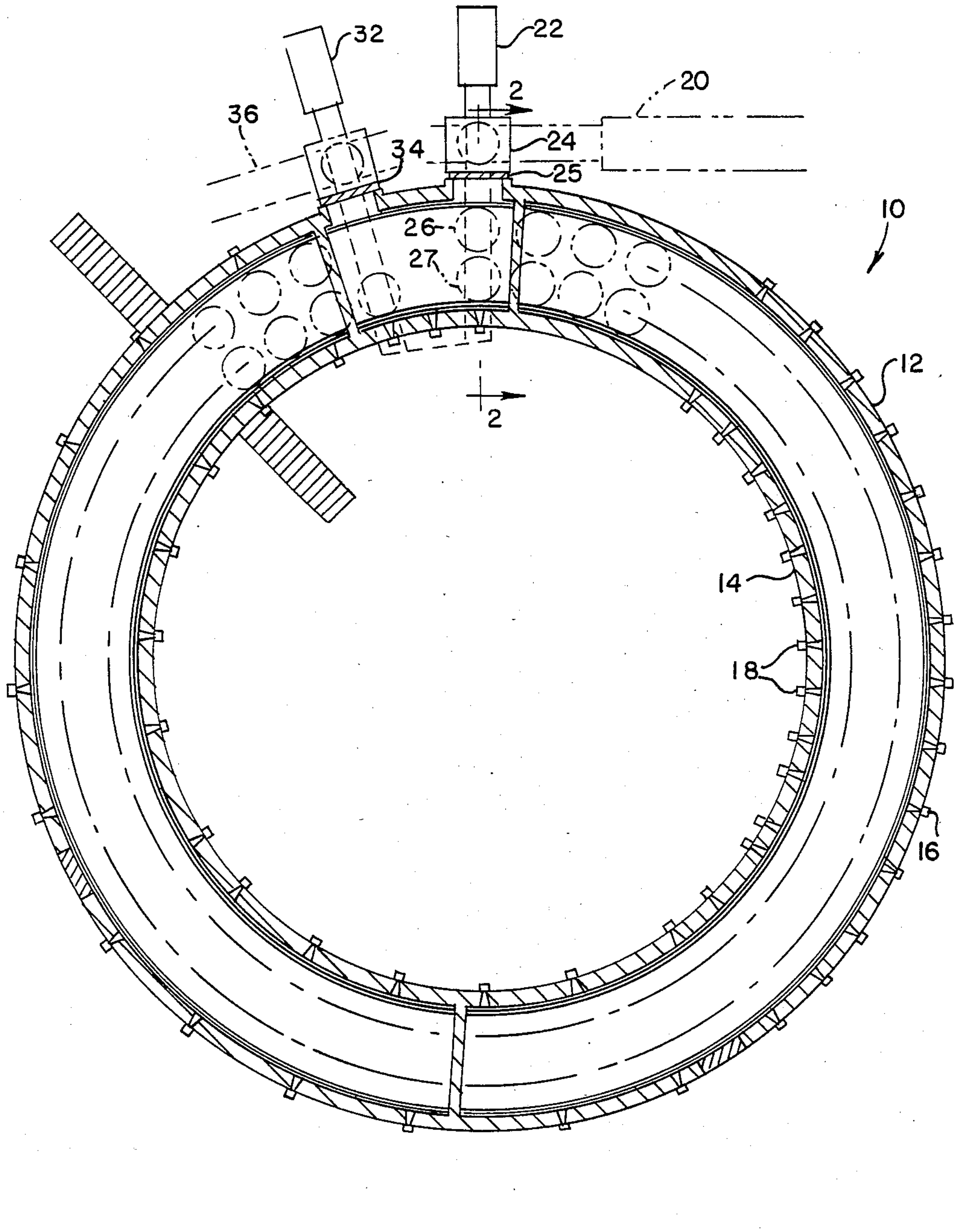
FIG. 1 is a top, partial cutaway view of a heat treating furnace.

Referring now to FIG. 1 of the drawings, a heat treating furnace is shown generally at 10. The furnace is of a circular ring shape, having outer refractory wall 12 and inner refractory wall 14 of generally circular shapes. Numerous gas burners such as 16 are located in outer wall 12 and similar gas burners 18 are located in inner wall 14. These burners are utilized to keep the insulated refractory portion of the heat treating furnace at a temperature desired to heat treat the particular objects. Due to the spacing and relative sizing of the burners, the heat treating furnace can, in effect, be separated into different zones of different temperatures. In the heat treating furnace shown, approximately 90 railways wheels can be accommodated in the furnace at any one time. The wheels enter on a track rail 20 and are deposited onto a charging device 24. Charging door 25 is opened and wheel 26 enters the heat treating furnace and is held on a support 30. (see FIG. 2) Wheels are removed from the heat treating furnace by discharge device 32 which includes an arm which enters heat treat furnace 10 through discharge door 34 and lifts the wheel off its support, removes the wheel from the furnace through discharge door 34 and places it on to discharge roller or track 36.

Figure 2:
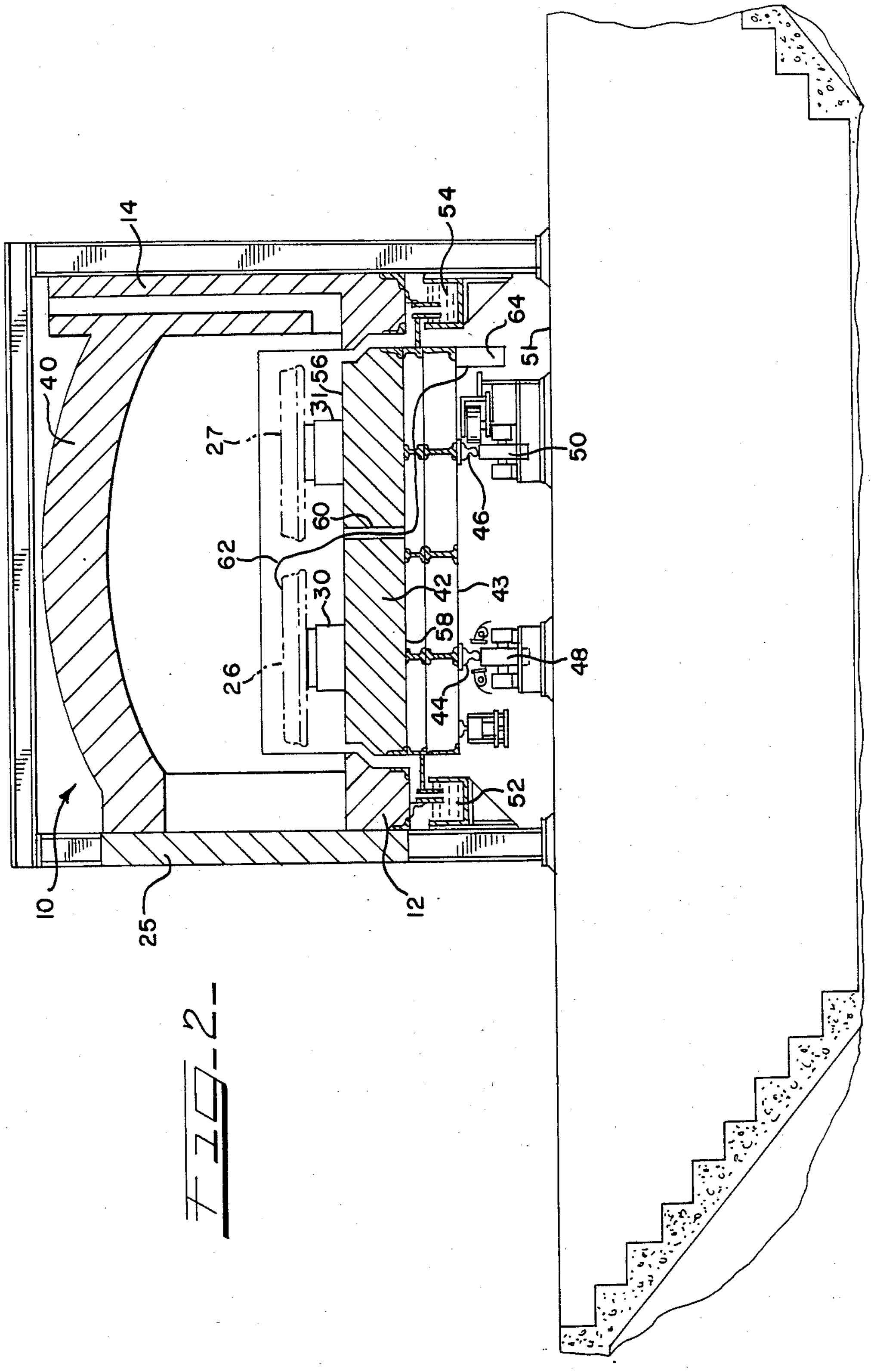
FIG. 2 is a partial cross section of one area of the heat treating furnace showing the temperature determining apparatus of the present invention.

Referring now to FIG. 2, a cross section through charging door 25 section of furnace 10 is shown. A curved roof 40 of refractory material joins upper portions of outer wall 12 and inner wall 14. Further, a movable hearth 42 of refractory material joins lower portions of outer wall 12 and inner wall 14. Hearth 42 is movable through heat treating furnace 10 on rollers 48 and 50 mounted on furnace floor 51. A base rail assembly 43 supports lower surface 58 of hearth 42, and base rail assembly 43 is in turn supported on rails 44 and 46. Rail 44 is adapted to move along roller 48, and rail 46 is adapted to move along roller 50. Insulation within the refractory temperature portion of heat treating furnace 10 is provided by hearth seals 52 and 54 located to the outer edges of hearth 42 thereby forming seals with the bottom surfaces of outer wall 12 and inner wall 14.

Upper surface 56 of hearth 42 includes support 30 which is adapted to hold railway wheel 26. A similar support 31 holds railway wheel 27 in a position radially inward from support 30.

Thermocouple wire 62 is affixed to a section of wheel 26 and extends through an opening 60 in hearth 42. The other end of thermocouple wire 62 is affixed to temperature display device 64. Temperature display device 64 is affixed to an outer edge of hearth 42 base support 43 and, accordingly, moves through heat treating furnace with hearth 42.

In a typical temperature determining operation in accordance with the present invention, wheel 26 will be positioned outside of charging door 25 on support 24. Thermocouple wire 62 will be passed from the lower side 58 of hearth 42 through opening 60 and out charging door 25. An end of thermocouple wire 62 is then affixed to railway wheel 26. Wheel 26 is then moved through open charging door 25 and onto pedestal support 30. Thermocouple wire 62 is pulled outwardly through hearth opening 60 to insure the use of a minimum amount of thermocouple wire 62, and then the other end of thermocouple wire 62 is affixed to temperature display device 64. This enables temperature display device 64 to rotate along with railway wheel 26 as hearth 42 moves through heat treating furnace 10. Accordingly, a temperature display of railway wheel 26 is provided throughout its travel through heat treating furnace 10.

What is claimed is:

1. A method of obtaining the temperature of an object being heat treated comprising the steps of:
   positioning an object to be heat treated outside a charging door to a circular shaped heat treating furnace,
   providing an opening in a ring shaped, flat hearth floor of the heat treating furnace, said hearth floor rotatable around the outer periphery of the furnace,
   inserting a thermocouple wire through the opening in the hearth floor of the heat treating furnace into the furnace and out of the charging door while said hearth is moving,
   connecting one end of the thermocouple wire to the object to be heat treated and then moving the object into the heat treating furnace,
   connecting the other end of the thermocouple wire on the outer side of the hearth to a temperature display device which is movable with the rotary moving heat treating furnace thereby providing a display of the temperature of the object as it travels through the heat treating furnace together with the hearth.

2. The method of claim 1 including the step of affixing the temperature display device to the hearth to move through the heat treating furnace therewith.

3. The method of claim 1 wherein the thermocouple wire is pulled outwardly from the hearth prior to connecting it to the temperature display device to insure that a minimum amount of the thermocouple wire is used.

4. The method of claim 1 wherein the heat treating furnace includes support rollers around its outer periphery and the hearth includes rails on its lower surface, the hearth rails adapted to be supported on said support rollers.

5. The method of claim 1 wherein the hearth includes means for supporting the objects to be heat treated as they move through the heat treating furnace.

6. Apparatus for obtaining the temperature of an object being heat treated comprising
   a ring shaped hearth rotatable within a generally circular heat treating furnace, said hearth forming a floor in said furnace,
   an opening in said hearth, a thermocouple wire passing through said opening such that one end of said wire is attached to an object being heat treated in said furnace and the other end of said wire extends radially outwardly to an outer edge of said hearth,
   and a temperature display device connected to the other end of said wire at the outer edge of said hearth to provide a display of the temperature of the object in said furnace.

7. The apparatus of claim 6 wherein said temperature display device is affixed to said hearth such that it rotates in said furnace with said hearth.

8. The apparatus of claim 6 wherein said hearth forms a bottom insulated surface of said furnace.

9. The apparatus of claim 6 wherein said hearth includes rails on its lower surface and said furnace includes support rollers on a floor area below said hearth such that said hearth rotates with said rails contacting said support rollers.

10. The apparatus of claim 6 wherein said hearth comprises a bottom insulated surface of said furnace, and said thermocouple wire is of a diameter, approximately equal to that of said opening in said hearth to minimize heat loss through said opening.

11. A method of determining the temperature of an object being heat treated including the steps of
   providing a heat treating temperature with a hearth movable therein,
   providing an opening in the hearth and inserting a thermocouple wire through the opening into the furnace and through a charging door of the furnace while the hearth is moving,
   connecting one end of the thermocouple wire to the object to be heat treated and then inserting the object into the furnace through the charging door,
   drawing the thermocouple wire radially outward from the furnace as the object is being inserted to insure the use of a minimum amount of thermocouple wire,
   and connecting the other end of the thermocouple wire to a temperature display device affixed to the outside of the hearth to indicate the temperature of the object as it moves through the heat treating furnace.

* * * * *